United States Patent [19]

Roberts

[11] Patent Number: 4,927,650

[45] Date of Patent: May 22, 1990

[54] FOOD PREPARATION

[75] Inventor: William W. Roberts, Port Dinorwic, Great Britain

[73] Assignee: Quick Cuisine Limited, Wales

[21] Appl. No.: 314,290

[22] Filed: Feb. 22, 1989

Related U.S. Application Data

[63] Continuation of Ser. No. 819,816, Jan. 16, 1986, abandoned.

[30] Foreign Application Priority Data

Jan. 16, 1985 [GB] United Kingdom ............... 8501105

[51] Int. Cl.⁵ ........................ A23B 7/04; A23B 7/16
[52] U.S. Cl. .................................. 426/295; 426/393; 426/524
[58] Field of Search ............... 426/289, 295, 393, 524, 426/518

[56]  References Cited

U.S. PATENT DOCUMENTS 4,478,861 10/1984 Montgomery et al. ............. 426/524

Primary Examiner—George Yeung

[57] ABSTRACT

A food product for a desired ultimate dish includes a divided main ingredient such as meat coated with dry particulate additional ingredients such as flavoring, thickening etc. agents. Preparation includes admixing the main and additional intgredients supplied at prescribed rates with the main ingredient offering surface adherence for the additional ingredients, and the final product remains divided. The desired ultimate dish is prepared in any required quantity simply by heating up the divided final product in a suitable cooking medium.

4 Claims, 2 Drawing Sheets

FOOD PREPARATION

This application is a continuation, of application Ser. No. 819,816, filed Jan. 16, 1986, now abandoned.

The invention relates to food preparation and to prepared foods as such, with particular reference to meat dishes.

It is, of course, well known to cook whole dishes as though for immediate consumption, i.e. all ingredients together including flavourings, thickeners etc. at least in the final stages of the cooking, and then to freeze same for storage and consumption later after retrieval by defrosting and heating up. For dishes such as stews and meat sauces intended to have a substantial liquor content at consumption (hereinafter called "wet dishes", i.e. other than relatively dry dishes such as prepared by grilling or frying), such preparation works well in terms of retrieving a tasty dish for consumption, but results in virtually solid frozen masses corresponding to, and thus retrievable only in, whatever sizes of containers are used for holding the prepared dish for freezing purposes.

It is one object of this invention to provide a prepared state for supply of products, called final products hereof, for such dishes that lends itself to more flexible retrieval, but continues to allow use of freezers, which are in widespread general use in view of their convenience for storing both other prepared dishes and other basic food materials such as meat, fish and vegetables from which those other dishes may be prepared. Whilst conceived in that connection and for ultimate wet dishes as aforesaid, it is possible to apply the principles of this invention more widely, even to vacuum packed final products and to final products for stir-fry dishes.

According to this invention a main ingredient for an ultimate, usually wet, food dish is in a divided state, typically minced for meat, and then has additional dish ingredients, such as flavouring or thickening agents etc, introduced thereto in a dry particulate condition capable of coating the divided main ingredient, both of the main and additional ingredients having first been prepared separately to states where (when admixed) they are readily brought to an intended state for consumption of th ultimate food dish. Usually, of course, such first preparation of the main ingredient will include precooking. The preferred resulting product, i.e. main ingredient(s) directly coated with additional ingredients, is readily frozen without resulting in a substantially solid mass and so is inherently suited to being used in other than predetermined batch quantities. An alternative, say for meat dishes with increased acidity for preservation purposes, would be controlled atmosphere packing to give a vet further increased storage or shelf life.

It will be appreciated that the divided main ingredient(s) should not have any significant tendency to stick together but should nevertheless have surfaces to which the particulate additional ingredients will attach. It is found to be safe, in terms of the microbiology of the product, for least divided cooked meat to be cold, typically cooled from its state immediately after its preparatory cooking is completed. However, it should obviously not be so cold as to be too dry for the required quantity of particulate, typically powdrous, additional ingredients to adhere thereto as a coating that will be held thereto reasonably securely not only as constituting our advantageous final product but also during its handling after mixing for coating purposes. On a very conservative basis, it is satisfactory for cooked meat to be at or a few degrees above or below the freezing point of water, e.g. minus 3° C. to 0° C., at entry to a mincer or chopper in turn feeding a main ingredient conveyor. However further tests indicate that lower temperatures at least to −5° C. can be practical at least for relative light or thin coatings and that higher temperatures at least up to 10° C. should be viable at least for relative heavy or thick coatings. Prime considerations, of course, remain achievement, for particular divided main ingredients and dry particulate additional ingredients relative to desired ultimate dishes, of surface adherence characteristics of the divided main ingredients that avoid coagulation problems before and after coating but take up the required quantity of additional ingredients by coating, perhaps conveniently expressed as quelling or substantially fully taking up initial adherence characteristics of the main ingredients.

As produced hereby, the final product hereof is in a state differing from its ultimate state for consumption in the ultimate dish by more than merely temperature, i.e. heating up with some suitable cooking medium produces a blending of the main and additional ingredients as required for the ultimate dish. In fact, particularly for wet dishes, the product normally needs addition of water at the time that it is heated up to make the ultimate dish for consumption. That, however, is seen more as an advantage than a disadvantage as the product could be lighter by some absent water content and so cheaper to transport in bulk, and the heating up process is in no way hampered by requiring additon of or to water or other cooking medium. It is not, in fact, necessary substantially to reduce water content as produced, save insofar as such would otherwise be associated with the additional ingredients or their combination with the main ingredient in the ultimate dish, nor always to add to water as some products may be made with a view to other quick final preparation, say by stir-frying in some other cooking medium, such as oil. Importantly, though, taking products hereof by scooping or otherwise of a desired quantity of divided flavoured main ingredient(s), as necessary adding same to water or other cooking medium such as oil, for heating up to serving temperature, is particularly convenient and saving of time.

Moreover, at least in relation to wet meat dishes, the conventional or traditional preparation by cooking all ingredients together inevitably results in significant loss of meat bulk into the liquor of the dish, some of which liquor is usually lost in the cooking, and the result is a dish in which the real meat bulk is not readily apparent as to quantity. By contrast, meat for the purposes of this invention can be precooked, possibly with injected liquor but normally in the absence of free liquor, and usually in much larger pieces before reduction to the desired divided state, and in a closely controlled manner so that the actual perceived meat bulk of the prepared product hereof is readily apparent and can be close to that of the uncooked meat. It will further be appreciated that separate supply of at least some of the distinctive dish flavouring etc. agents for addition in a relatively dry finely divided state not only further assists close quality control but also can produce very substantial savings of bulk and weight of the final product due to no liquor content being necessarily associated with the additional ingredients.

This invention is further applicable where ultimate dishes will have further ingredients, for example rice, pasta, beans or other vegetables, for which a full cooking time exceeds that for the user to deal with the aforesaid precooked main ingredients hereof. Then, such further ingredients may themselves be precooked and mixed in with the main ingredients along with the above-mentioned additional ingredients, thereby coating both the former. It will be evident that uncooked further ingredients may similarly be added, so long as they will cook in the heat up time for the main ingredients, and any or all further ingredients added before, during or after the additional ingredient mixing stage.

Preferred apparatus includes two or more feeders, one for the divided cooked main ingredient(s) and which can conveniently operate relative to a rate of supply by weight or loss of weight, and another for the above-mentioned additional ingredients and which can also operate relative to weight or loss of weight, or can simply be speed, and thus volumetric rate, but in either case controlled in a proportionate manner relative to the main ingredient(s) feeder. Both such feeders may deliver into a mixer stage serving to assist in promoting the desired coating of the divided cooked main ingredients by the particulate additional ingredient, i.e. preferably without significant compaction effect. We then find it convenient to have both such feeders deliver together into a common inlet to the mixer, i.e. at least to some extent already mixed. Where further ingredients, usually also precooked or otherwise treated (e.g. blanched), are to be included, one or more further feeders can be employed and may usefully also deliver into the mixer stage in common with the first two feeders.

It is further to be appreciated that desired control of such aforesaid units, i.e. including mincer, main ingredient(s) feeder, additional ingredients feeder, any other feeders, and mixer, is readily achieved via a master controller operating on a program-controlled data processing basis, and that the latter may further control a feed system from the mixer output whether onto trays for freezing to final product temperature or more directly through a continuous freezer station such as tunnel freezer.

Specific implementation of the invention will now be described, by way of example, with reference to the accompanying drawings, in which:

FIG. 3 is a fragmentary plan view at feeder means.

Figure 1:
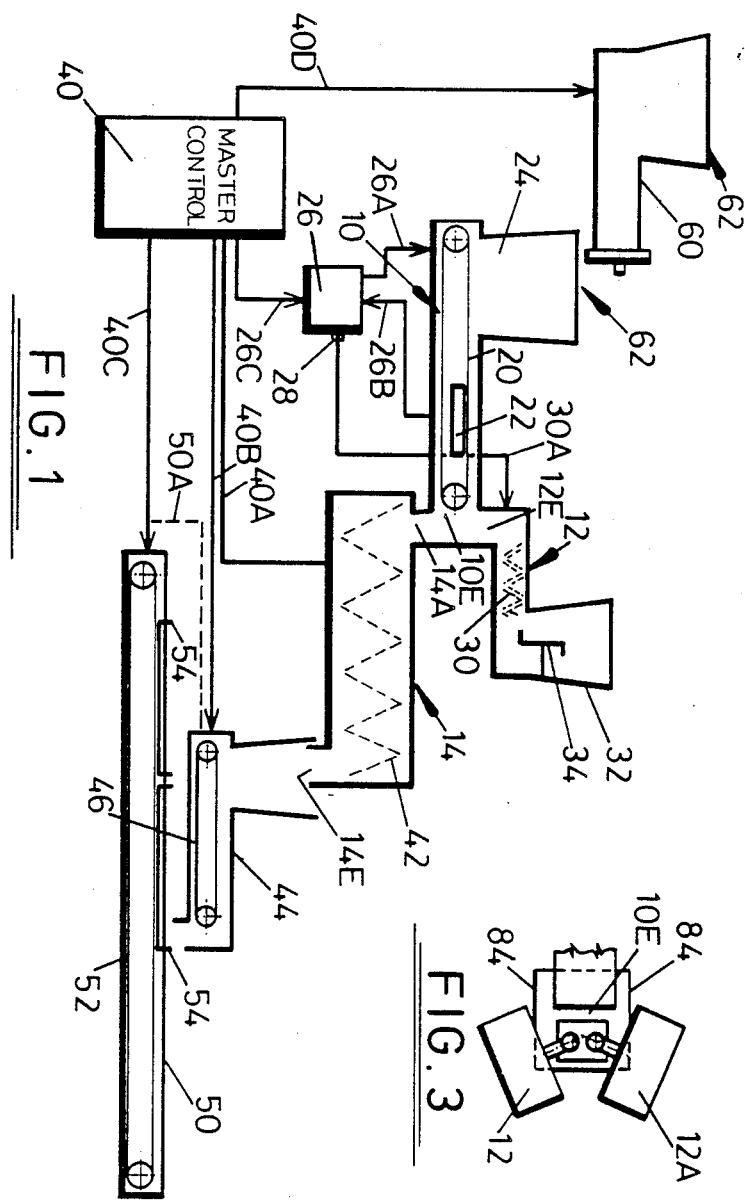
FIG. 1 is a schematic diagram of suitable apparatus units.

In the drawing, a feeder 10 is shown for divided cooked main ingredient(s), typically meat, and a feeder 12 for particulate additional ingredients, both feeding into a mixer 14. As shown, outlets 10E and 12E of the feeders 10 and 12, respectively, feed together at entry 14A to the mixer 14, the particulate additional ingredients coming in above the main ingredient(s) and both falling together into the mixer.

A suitable feeder 10 is of a belt drive type having an endless belt 20 shown going over end rollers 20A and 20B, either or both of which may be driven, and associated with a load cell 22. Such feeders which operate relative to an input hopper 24 by varying speed control of a belt drive motor (not shown) according to a preset desired delivery rate and weight-representative output from the load cell are known, for example available from K-TRON. A basic control unit is indicated at 26 with output 26A representing motor speed control, input 26B from the load cell 22, and input 26C for demand or preset purposes.

A suitable feeder 12 is of a twin-screw type with its screws at 30 serving to take particulate additional dish ingredients to exit 12E from an input hopper 32 usually including an agitator 34 which for the purposes hereof can serve as a blender for additional ingredients added or fed separately into the hopper 32. Such feeders 12 operating on a volumetric basis according to speed control of their screw drives (not shown) are well known, for example also available from K-TRON. A speed control input signal line is shown at 30A, actually slaved to operation of the conveyor 20 via its controller 26, but in any event with some variable proportionate preset whether at the controller 26, see 28, or, and more likely here, presettable over line 26C or other line from a master controller 40 of program controlled digital data processing type.

Other feeder(s) for further ingredients, usually but not necessarily pre-cooked (or subjected to treatment relevant to the dish), and in a natural or imposed divided state, can be of such types as suit the purposes of implementing this invention, i.e. weight/loss of weight or speed/volumetric, but controlled relative to main ingredient(s) supply and usefully normally feeding into the mixer stage.

The mixer 14 is shown of tubular cased type with its inlet 14A at the top of one and its outlet 14E at the bottom of the other end, and a rotary bladed translation mechanism 42 which may be of conventional interruptured spiral type. The latter could be of worm type or, to reduce compaction tendencies, of a discrete bladed type of suitable inclination and pitch.

As shown, the mixer 14 is controlled for speed over line 40A from the master controller 40, though it could be controlled manually or subject to a manual over-ride. The mixer 14 serves to drop its contents into an intermediate outfeed stage 44 including a belt conveyor 46 that is intermittently driven and controlled via line 40B from the master controller in association with an underlying tray conveyor 50 also shown as being of endless belt type 52 carrying trays 54 and intermittently stepped out-of-phase with the drive to the intermediate conveyor 46, see further line 40C from the master controller 40, or alternative dashed line 50A if derived from signals supplied to the conveyor 46 over line 40B. Alternatively, the conveyor 52 could be continuously driven with conveyor 46 slaved to sensed presence of trays.

The divided main ingredient(s) conveyor hopper 24 may be of a vibratory type and is shown supplied by a mincer 60 (at least for meat) also controlled by the master controller 40, see line 40D, and receiving cooked main meat ingredient in more sizable pieces at 62.

It will, of course, be appreciated that the mixer 14 could supply directly onto an outfeed conveyor that went directly through a continuous freezer.

Figure 2:
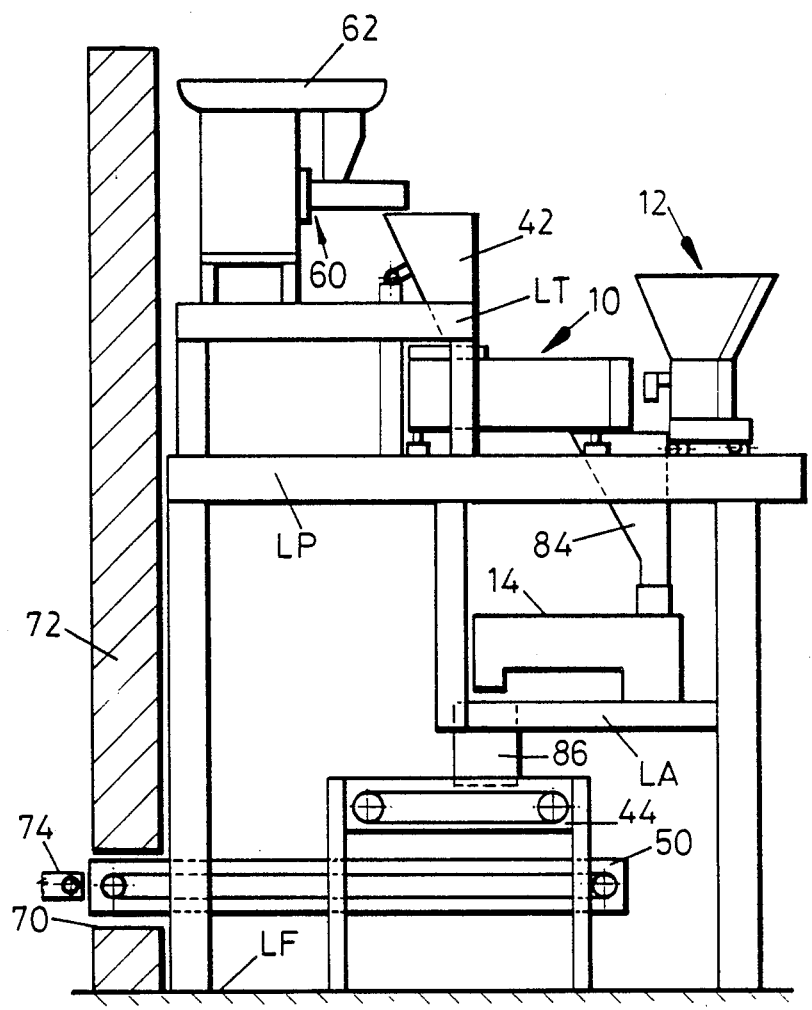
FIG. 2 shows a practical layout.

One particular practical layout of apparatus hereof is shown in FIG. 2 where the tray conveyor 50 is shown located relative to floor level LF and delivering at 70 directly into a freezer of which wall 72 is shown and a subsidiary conveyor system indicated fragmentarily at 74. The conveyor 50 is shown in a conjoint system with outfeed conveyor 46 below mixer 14 at a higher level LA, actually shown slung below a main platform level LP on which are main ingredient feeder 10, particulate additional ingredient feeder 12 shown for convenience as mounted on a wheeled trolley, and any further ingredient feeder or feeders, see 12A in FIG. 3. Chopper or mincer 60 for the main ingredient(s) is shown on a table LT. Appropriate hopper feeds are shown at 62, 42 (vibratory) 84 and 86.

Much scope is seen for prepared products to be supplied frozen, and particularly from which wet meat dishes can be produced by the simple expedient of admixing with water for heating up to serving temperature for consumption. Moreover, the invention is seen as applying with especially advantage to such dishes where the main meat ingredient is minced usually after cooking under closely controlled conditions in a sealed vessel or oven so that bulk loss is minimised or made to a predetermined extent, say to guarantee a prescribed lean/fat proportion.

At least when done with the cooked meat cold, such division there of by mincing has no undue later tendency to agglomerate within vibratory or agitated feed hoppers and the mixer stage.

It is, of course, the case that the divided meat is taken along spread over a weight/speed controlled feeder conveyor to meet with a stream of particulate, typically powdrous, additional dish ingredients which it is required should attach themselves, usually quite lightly, as a coating to such divided meat, but nonetheless, in a manner such as to be consolidated therewith, but still generally divided or readily divisible, at reduced temperatures applying to frozen foods, say −20° C. to −30° C. We have mentioned −3° C. to 0° C. for mincing or dicing, and find that suitable for beef and other meats in avoiding formation of ice crystals (helped by salt content of the meat) and assuming a satisfactorily low temperature after processing, but that should not be taken as limiting to meat only so long as the end result is as set out above.

Further ingredients as mentioned above can similarly be arranged to meet with the stream of particulate additional ingredients.

Any quantities of the resulting product, from individual portions upwards, can then be scooped out and used with water, perhaps in some instances stir-fried, to prepare a meal most speedily and conveniently with all ingredients thereof (including main and any further as aforesaid) becoming ready to eat at the same time. Furthermore, the capability of closely controlling both the additional ingredients in particulate form and the divided cooked meat or other ingredients lends itself particularly to achieving reliable products of consistent texture and taste.

It will be appreciated that this invention is particularly suited to large volume centralised production of prepared products hereof on a virtually continuous basis.

Finally, it is worth pointing out that the invention is applicable to main dish ingredients divided in some other way, for example chopped or diced, and, of course, whether same are meat or not; and that some flavouring etc. ingredients might conceivably be incorporated at cooking and/or at addition of water by the user albeit at some risk of departing from the ultimate closeness of qualitative and quantitative controls afforded as described above.

We claim:

1. A method of producing a food product for a food dish requiring a main ingredient and further ingredients at least for flavoring purposes, said method comprising the steps of:

preparing a main ingredient and further ingredients separately to states wherein the further ingredients are in a dry particulate condition and wherein the main ingredient and the further ingredients are admixable to form said food product which can be quickly and readily brought to a state ready for consumption;

chilling the prepared main ingredient to between −5° C. and +10° C. and dividing the chilled main ingredient; and after said chilling has been completed, continuously and simultaneously:

supplying the chilled and divided main ingredient and the unchilled dry particulate further ingredients into a mixing chamber separately and at independently controllable rates;

admixing the chilled and divided main ingredient and the dry particulate further ingredients in the mixing chamber to form a combined product where the main ingredient is coated by the dry particulate further ingredients; and removing the combined product from the mixing chamber.

2. The method of producing a food product of claim 1, wherein said chilling includes the step of chilling the main ingredient to a temperature in the range −3° C. to 0° C. prior to said dividing and admixing.

3. The method of producing a food product of claim 1, wherein the main ingredient is meat, wherein said preparing step includes the step of pre-cooking the meat to a point where the meat is ready for consumption by subsequent heating in a liquid cooking medium.

4. The method of producing a food product of claim 3 additionally including the steps of separately pre-cooking, chilling, and dividing prior to admixing a second main ingredient in forming the combined product.

* * * * *